United States Patent
Johnson

(10) Patent No.: US 9,554,517 B2
(45) Date of Patent: Jan. 31, 2017

(54) SEPARABLY-DRIVEN ROTOR PORTIONS AND ASSOCIATED METHOD FOR THRESHING GRAIN

(71) Applicant: Pioneer Hi-Bred International, Inc., Johnston, IA (US)

(72) Inventor: David L. Johnson, Johnston, IA (US)

(73) Assignee: PIONEER HI-BRED INTERNATIONAL, INC., Johnston, IA (US)

( * ) Notice: Subject to any disclaimer, the term of this patent is extended or adjusted under 35 U.S.C. 154(b) by 153 days.

(21) Appl. No.: 13/916,267

(22) Filed: Jun. 12, 2013

(65) Prior Publication Data

US 2013/0337876 A1 Dec. 19, 2013

Related U.S. Application Data

(60) Provisional application No. 61/659,208, filed on Jun. 13, 2012, provisional application No. 61/775,144, filed on Mar. 8, 2013.

(51) Int. Cl.
*A01F 7/06* (2006.01)
*A01F 12/18* (2006.01)
(Continued)

(52) U.S. Cl.
CPC ............ *A01F 7/067* (2013.01); *A01F 7/06* (2013.01); *A01F 12/10* (2013.01); *A01F 12/18* (2013.01);
(Continued)

(58) Field of Classification Search
USPC ............................. 460/59, 63, 66–68, 70, 98
See application file for complete search history.

(56) References Cited

U.S. PATENT DOCUMENTS 3,373,871 A * 3/1968 Huether ................ A01F 12/442
209/284
3,769,988 A * 11/1973 Burenga ................ A01D 45/24
414/502
(Continued)

FOREIGN PATENT DOCUMENTS

CN 201450820 U 5/2010
DE 1941248 A1 2/1971
(Continued)

OTHER PUBLICATIONS

International Search Report and Written Opinion for International Application No. PCT/US2013/045172, date mailed Aug. 30, 2013.
(Continued)

*Primary Examiner* — Alicia Torres
(74) *Attorney, Agent, or Firm* — Pioneer Hi-Bred Int'l, Inc.

(57) ABSTRACT

Separably-driven rotor portions for a combine harvester and a method for threshing grain using separably-driven rotor portions are provided. The combine harvester is moved through harvest material comprising grain material and material-other-than-grain ("MOG"). The grain material is separated from the MOG using multiple processing areas. The auger portion may be stopped or rotated at a slower speed with respect to rotation of the threshing portion to simulate the gathering of a large amount of crop material even when small plots are involved, thereby providing the benefits of large-plot harvesting to small-plot applications.

8 Claims, 12 Drawing Sheets

(51) Int. Cl.
    *A01F 12/10*           (2006.01)
    *B65G 33/22*         (2006.01)
    *A01F 12/44*           (2006.01)
    *A01F 12/22*           (2006.01)

(52) U.S. Cl.
    CPC ............. *A01F 12/22* (2013.01); *A01F 12/442* (2013.01); *B65G 33/22* (2013.01)

(56) References Cited

U.S. PATENT DOCUMENTS

| | | |
|---|---|---|
| 3,940,911 A | 3/1976 | Schmitt |
| 4,250,896 A | 2/1981 | Wagstaff |
| 4,344,442 A | 8/1982 | Torland |
| 4,422,462 A | 12/1983 | Decoene |
| 4,464,887 A | 8/1984 | Decoene et al. |
| 4,465,082 A | 8/1984 | Strubbe |
| 4,510,946 A | 4/1985 | Decoene et al. |
| 4,611,605 A | 9/1986 | Hall et al. |
| 7,140,961 B2 * | 11/2006 | Visagie et al. .................. 460/66 |
| 9,011,222 B2 | 4/2015 | Johnson et al. |
| 2015/0181808 A1 | 7/2015 | Johnson et al. |

FOREIGN PATENT DOCUMENTS

| | | |
|---|---|---|
| DE | 202004014608 U1 | 12/2004 |
| SU | 1130223 A1 | 12/1984 |

OTHER PUBLICATIONS

"Axial-Flow Combines Class V-IX," Case 1H Brochure, CNH America LLC (2009), 35 pages.

International Search Report and Written Opinion of the Searching Authority for Application No. PCT/US2012/061037 dated Jan. 28, 2013.

\* cited by examiner though combines may have various configurations, most are designed to separate grain from material-other-than-grain ("MOG"). Harvested grain is typically stored on the combine, and MOG is ejected back onto the crop field.

SEPARABLY-DRIVEN ROTOR PORTIONS AND ASSOCIATED METHOD FOR THRESHING GRAIN

CROSS-REFERENCE TO RELATED APPLICATIONS

The present application claims priority to U.S. Provisional Patent Application No. 61/659,208, filed Jun. 13, 2012, and U.S. Provisional Patent Application No. 61/775,144, filed Mar. 8, 2013, the entire contents of which are incorporated herein by reference.

FIELD OF THE INVENTION

The present invention relates generally to rotors for combine harvesters and methods for threshing grain.

BACKGROUND

A combine harvester (also known simply as a "combine") is a well-known machine used in agricultural applications. In general, combines are designed to travel through crop fields to harvest crop materials. Although combines may have various configurations, most are designed to separate grain from material-other-than-grain ("MOG"). Harvested grain is typically stored on the combine, and MOG is ejected back onto the crop field.

In general, a typical combine is designed to move through large crop fields, and the operations performed by the combine (e.g., cutting, threshing, and cleaning the grain) are most efficient when large amounts of grain are being processed. A combine is operated, for the most part, continuously, and the speed of the movement of the grain through the combine is generally fixed. In some cases, for example, the ground speed of a combine may be adjusted to control the volume of material passing through the combine. A commercial combine is typically designed to be continuously operated in a fully-loaded condition to optimize performance. Combine performance may include material throughput, harvesting efficiency, and harvested grain quality.

Combines, however, are not only used to harvest crops in a commercial setting, but are also used in research settings involving smaller plots of crops. In a research setting, the same type of combine (e.g., a commercial combine) may be used under intermittently-loaded conditions.

As a result, there is a need in the art for a combine harvester and method configured for efficiently threshing crop material gathered in batches from small research plots rather than continuously from large commercial fields.

BRIEF SUMMARY OF VARIOUS EMBODIMENTS

The present invention addresses the above needs and achieves other advantages by providing a combine harvester and method for threshing grain using a separably-driven rotor feed auger. In general, the combine harvester is moved through harvest material comprising grain material and material-other-than-grain ("MOG"). The grain material is separated from the MOG by transporting the harvested material through the combine harvester using multiple processing areas. In some embodiments, in a threshing area of the combine harvester, the material to be threshed is collected and held until a collection threshold is reached. After the collection threshold is reached, the material is passed into the threshing portion of the threshing area and threshed as a group of material. Transportation of the group of material from a holding location to the threshing portion substantially simultaneously thus simulates the gathering of a large amount of crop material even when small plots are involved, thereby providing the benefits of large-plot harvesting to small-plot applications, as described in greater detail below.

In some embodiments, a rotor for threshing grain in a combine harvester is provided in which the rotor comprises an auger portion and a threshing portion. The auger portion may be configured to rotate about an axle, wherein the auger portion defines an auger inlet end and an auger outlet end, and wherein rotation of the auger portion serves to move material to be threshed toward the auger outlet end. The threshing portion may be substantially aligned with the auger portion and may be configured to rotate about the axle. The threshing portion may define a threshing inlet end and a threshing outlet end, wherein the threshing inlet end is configured to receive the material to be threshed from the auger outlet end, and wherein rotation of the threshing portion serves to thresh the material and move the threshed material toward the threshing outlet end. Rotation of the threshing portion may be independent of rotation of the auger portion about the axle.

The auger portion may comprise an auger drive shaft end configured to be connected to an auger drive mechanism, and the threshing portion may comprise a threshing drive shaft end configured to be connected to a threshing drive mechanism. In some embodiments, the auger drive shaft end may be disposed proximate the auger inlet end and/or the threshing drive shaft end may be disposed proximate the threshing outlet.

In some cases, the auger portion may comprise an auger drive shaft end and the threshing portion may comprise a threshing drive shaft end, wherein the threshing drive shaft end is configured to be connected to a threshing drive mechanism, and wherein the auger drive shaft end is configured to be selectively connected to the threshing drive mechanism. The auger drive shaft end may be disposed proximate the auger outlet and may be configured to be selectively connected to the threshing drive mechanism via a clutch that selectively connects the auger drive shaft end to the threshing portion, such that rotation of the threshing portion causes rotation of the auger portion when the clutch is engaged.

In some embodiments, the auger portion may be configured to rotate at a first speed that is less than a speed of rotation of the threshing portion. The auger portion may be configured to be idle. Alternatively or additionally, the auger portion may be configured to rotate at a second speed that is less than the speed of rotation of the threshing portion and is greater than the first speed. The auger portion may, in some embodiments, be configured to rotate at a predefined speed that is fixed with respect to a speed of rotation of the threshing portion.

In other embodiments, a method for threshing grain in a combine harvester is provided. The method may include rotating an auger portion about an axle and rotating a threshing portion about the axle. The auger portion may define an auger inlet and an auger outlet, and rotation of the auger portion may serve to move material to be threshed from the auger inlet toward the auger outlet. The threshing portion may define a threshing inlet and a threshing outlet, wherein the threshing inlet is configured to receive material to be threshed from the auger outlet, and wherein rotation of the threshing portion serves to thresh the material and move the threshed material toward the threshing outlet. Rotation of the threshing portion may be independent of rotation of the auger portion about the axle.

In some cases, the auger portion may comprise an auger drive shaft end configured to be connected to an auger drive mechanism, and the threshing portion may comprise a threshing drive shaft end configured to be connected to a threshing drive mechanism. The auger drive shaft end may be disposed proximate the auger inlet, and/or the threshing drive shaft end may be disposed proximate the threshing outlet. In some embodiments, the auger portion may comprise an auger drive shaft end and the threshing portion may comprise a threshing drive shaft end, wherein the threshing drive shaft end is configured to be connected to a threshing drive mechanism, wherein the method further comprises selectively connecting the auger drive shaft end to the threshing drive mechanism. The auger drive shaft end may be configured to be selectively connected to the threshing drive mechanism via a clutch that selectively connects the auger drive shaft end to the threshing portion, such that rotation of the threshing portion causes rotation of the auger portion when the clutch is engaged.

Rotating the auger portion may, in some cases, comprise rotating the auger portion at a first speed that is less than a speed of rotation of the threshing portion. The method may further comprise maintaining the auger portion idle. In some cases, the auger portion may be rotated at a second speed that is less than the speed of rotation of the threshing portion and is greater than the first speed. In some embodiments, rotating the auger portion may comprise rotating the auger portion at a predefined speed that is fixed with respect to a speed of rotation of the threshing portion.

BRIEF DESCRIPTION OF THE DRAWINGS

Figure 1:
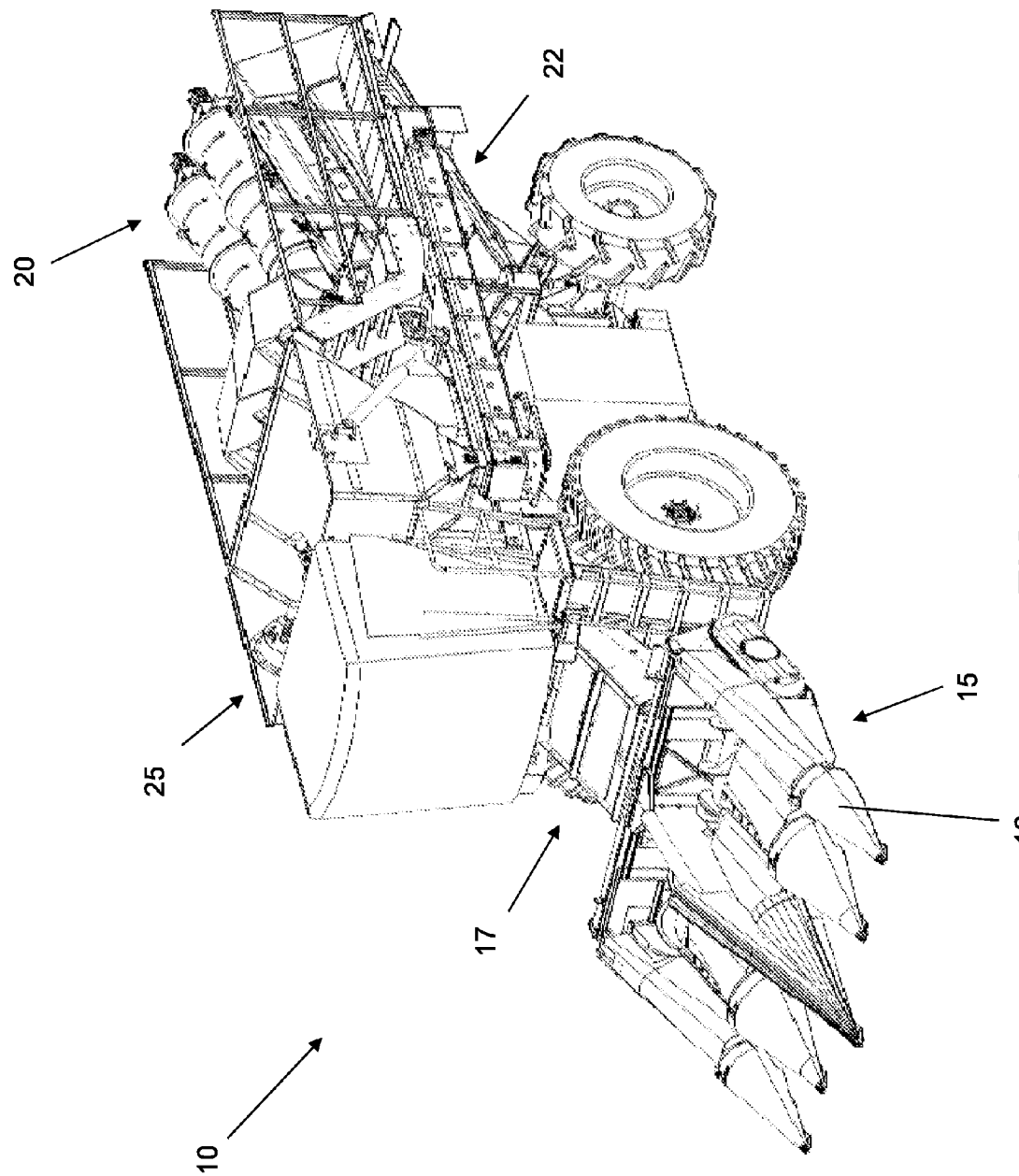
Figure 2:
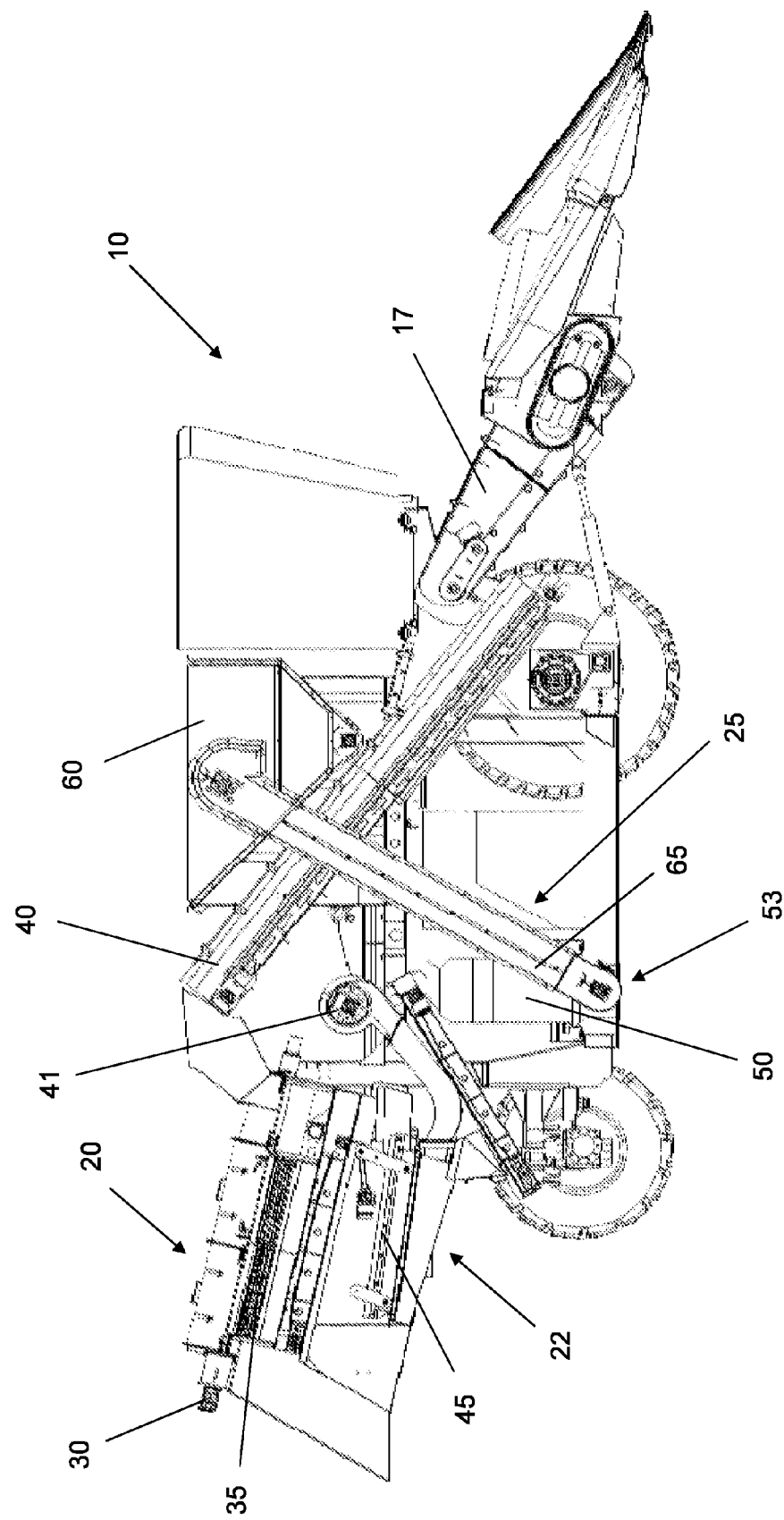
Figure 3:
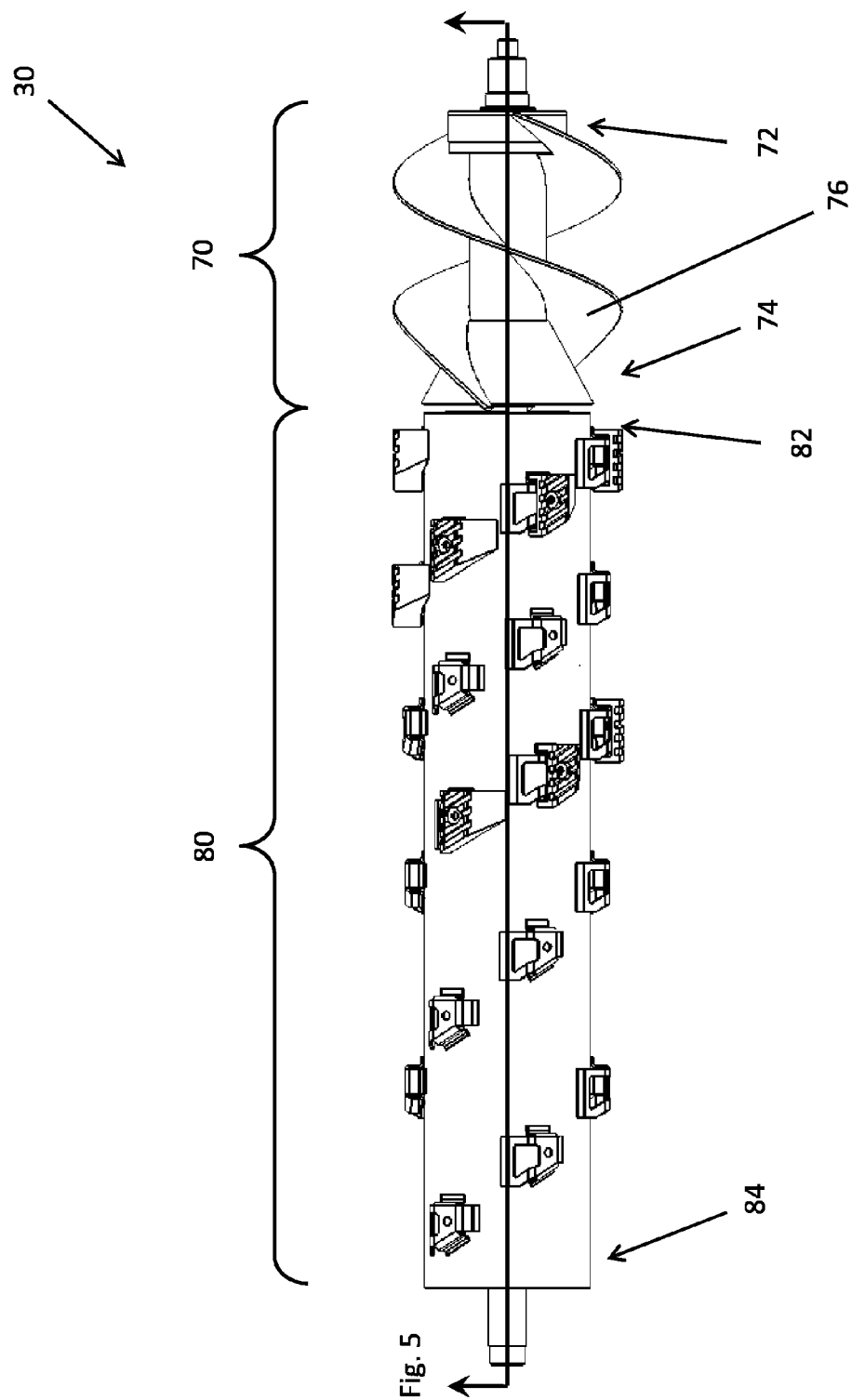
Figure 4:
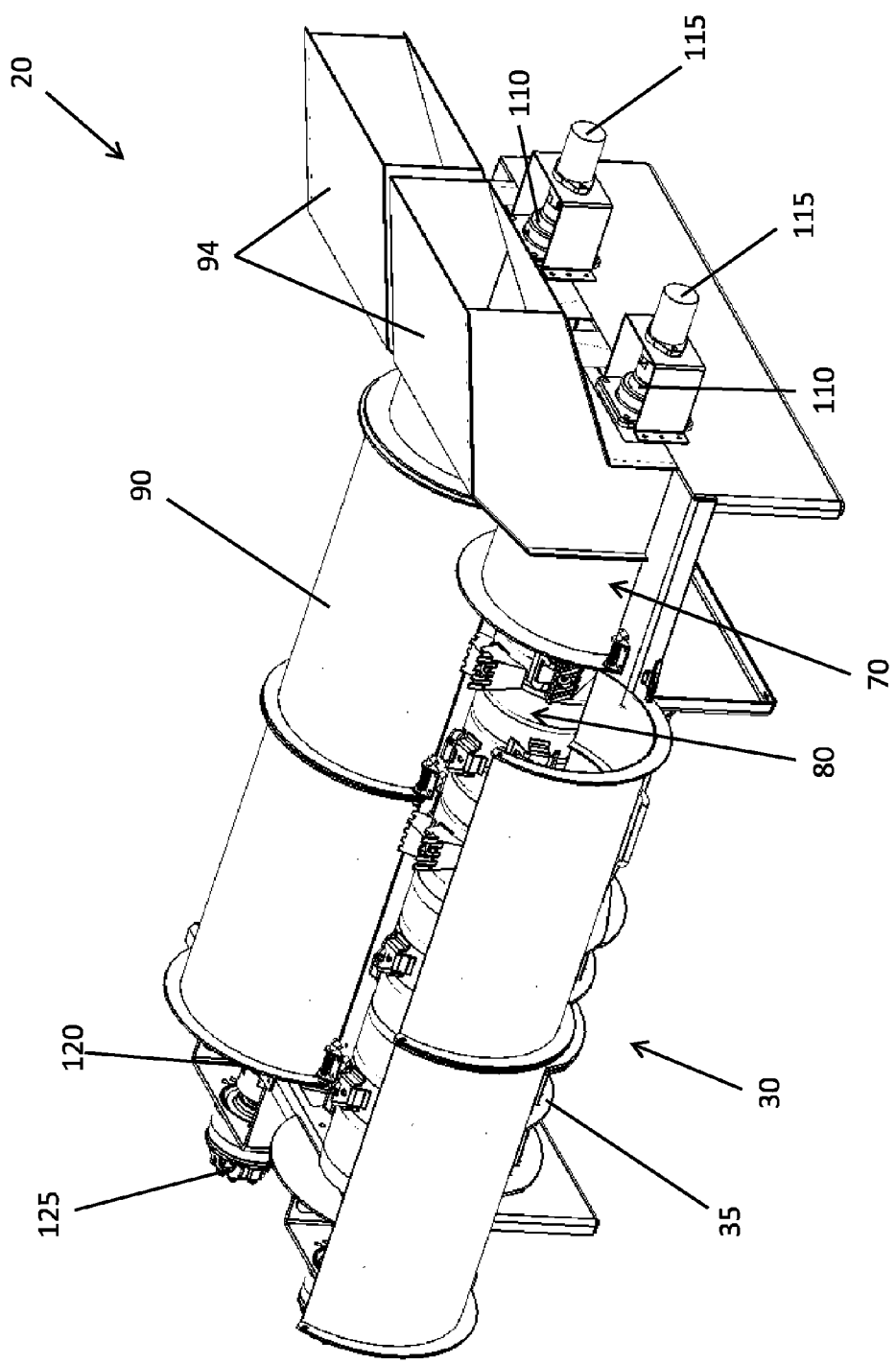
Figure 5:
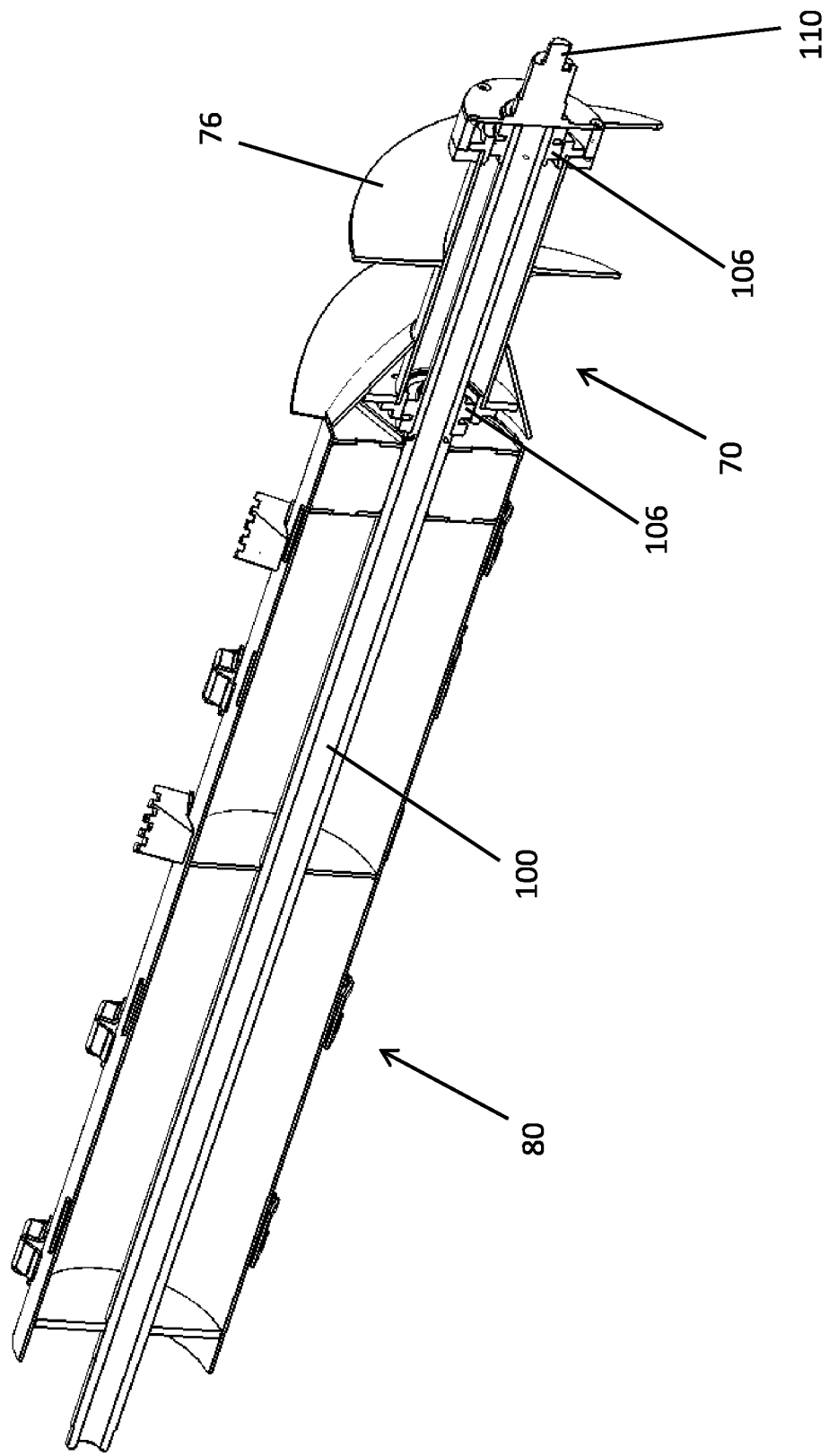
Figure 6:
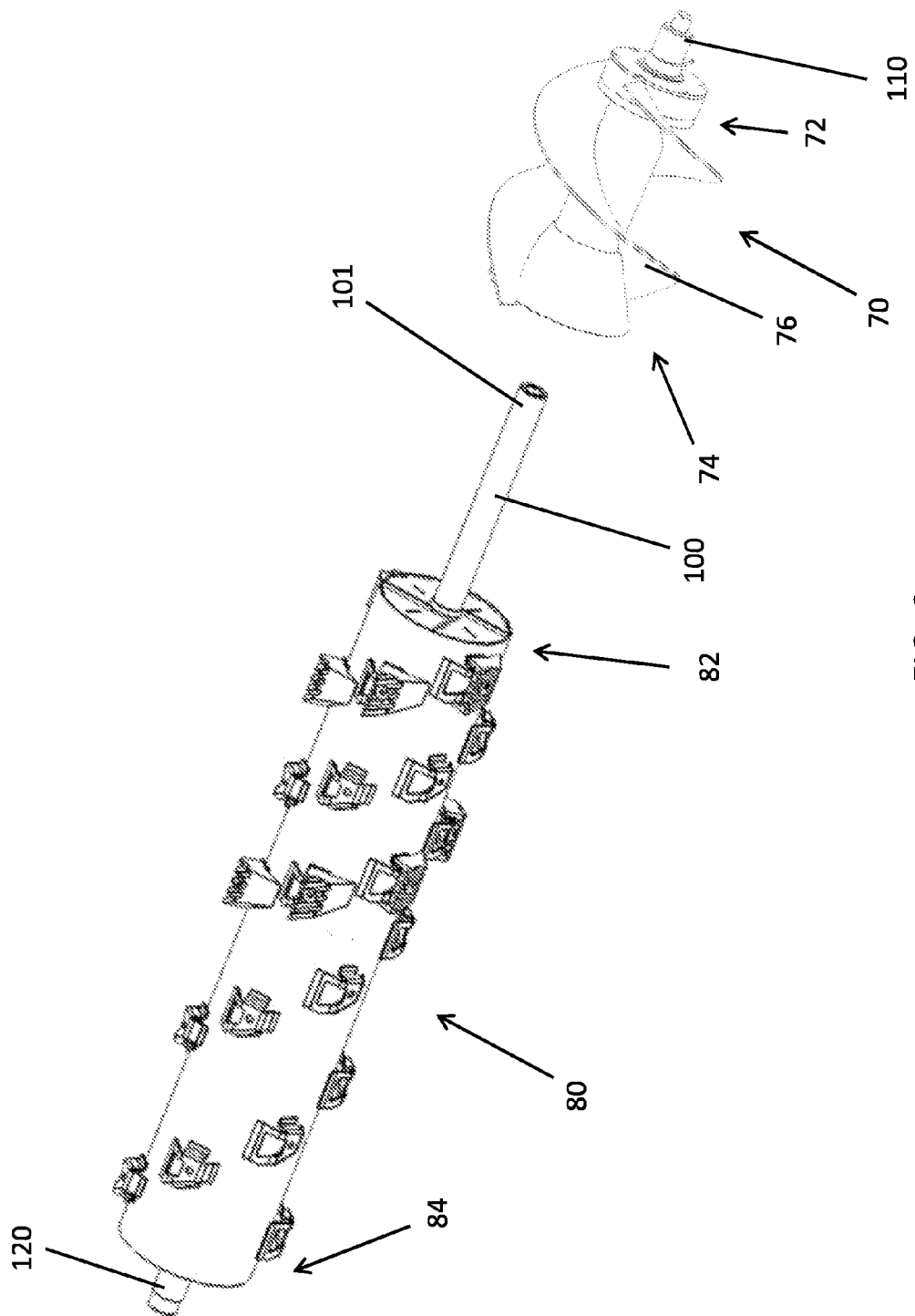
Figure 7:
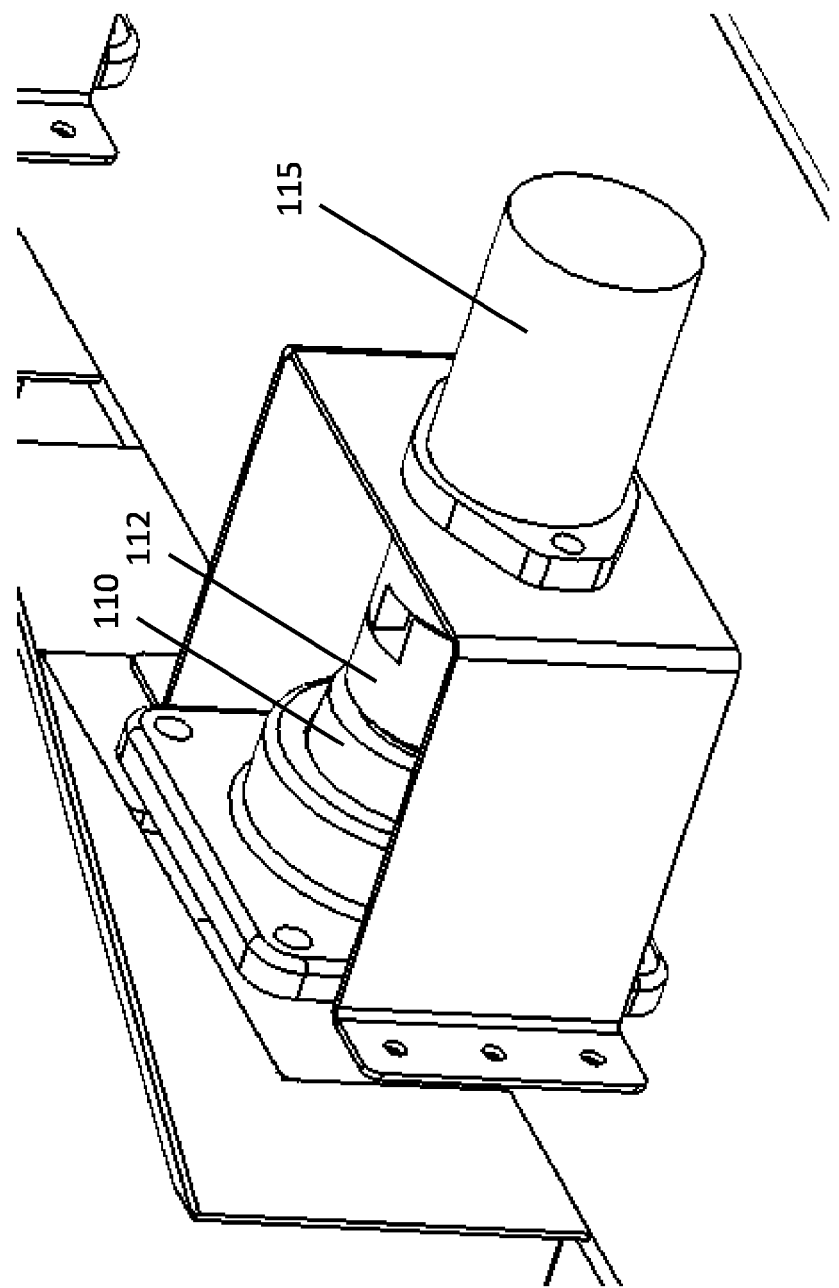
Figure 8:
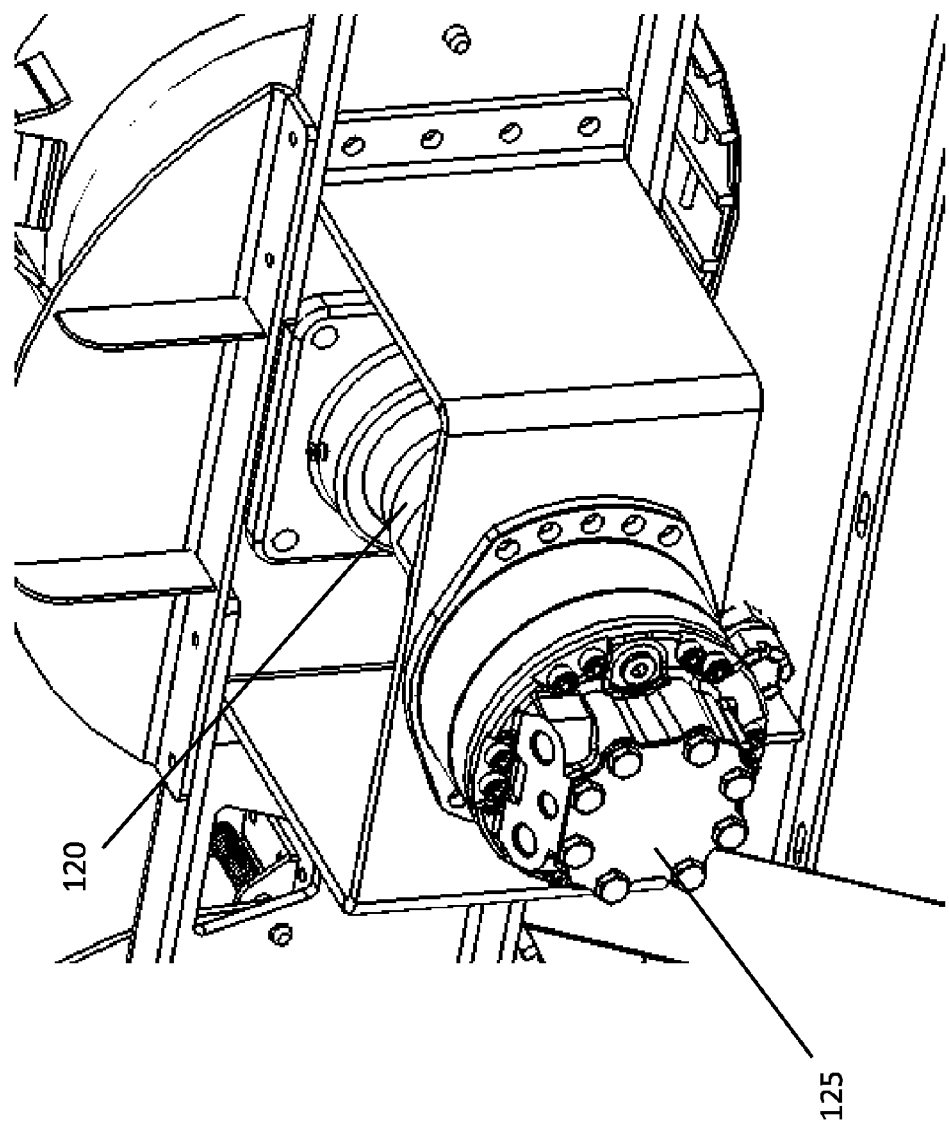
Figure 9:
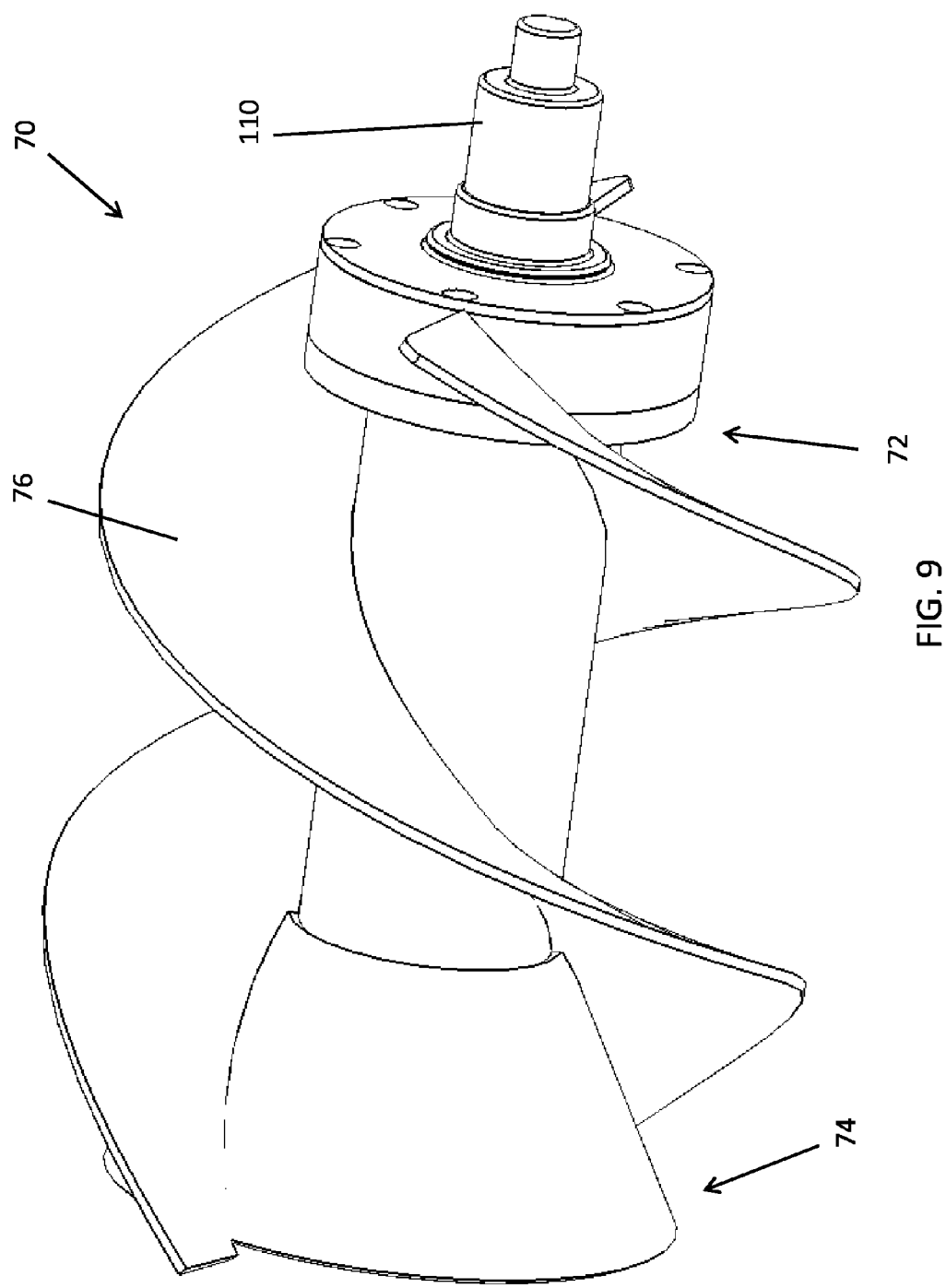
Figure 10:
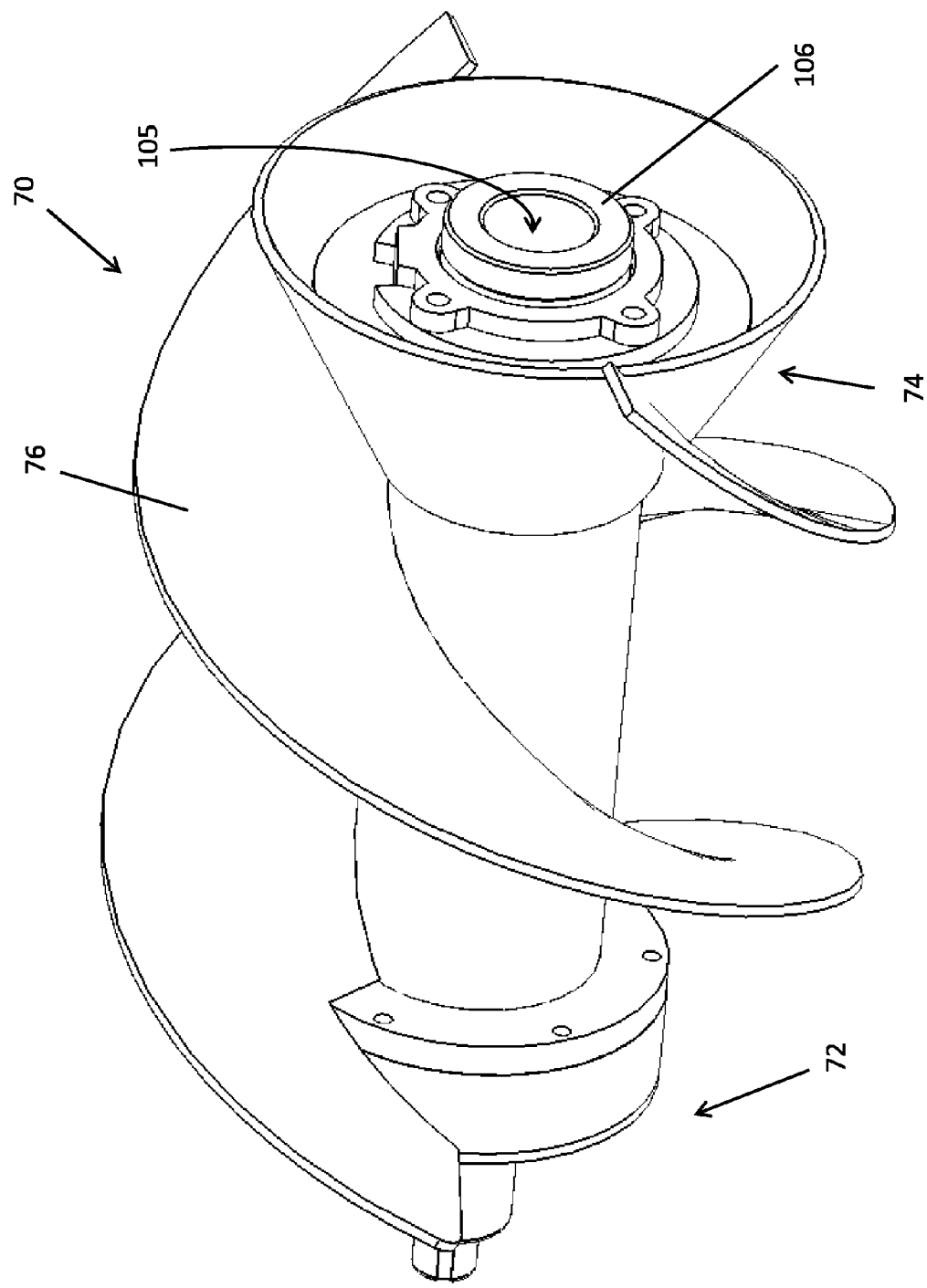
Figure 11:
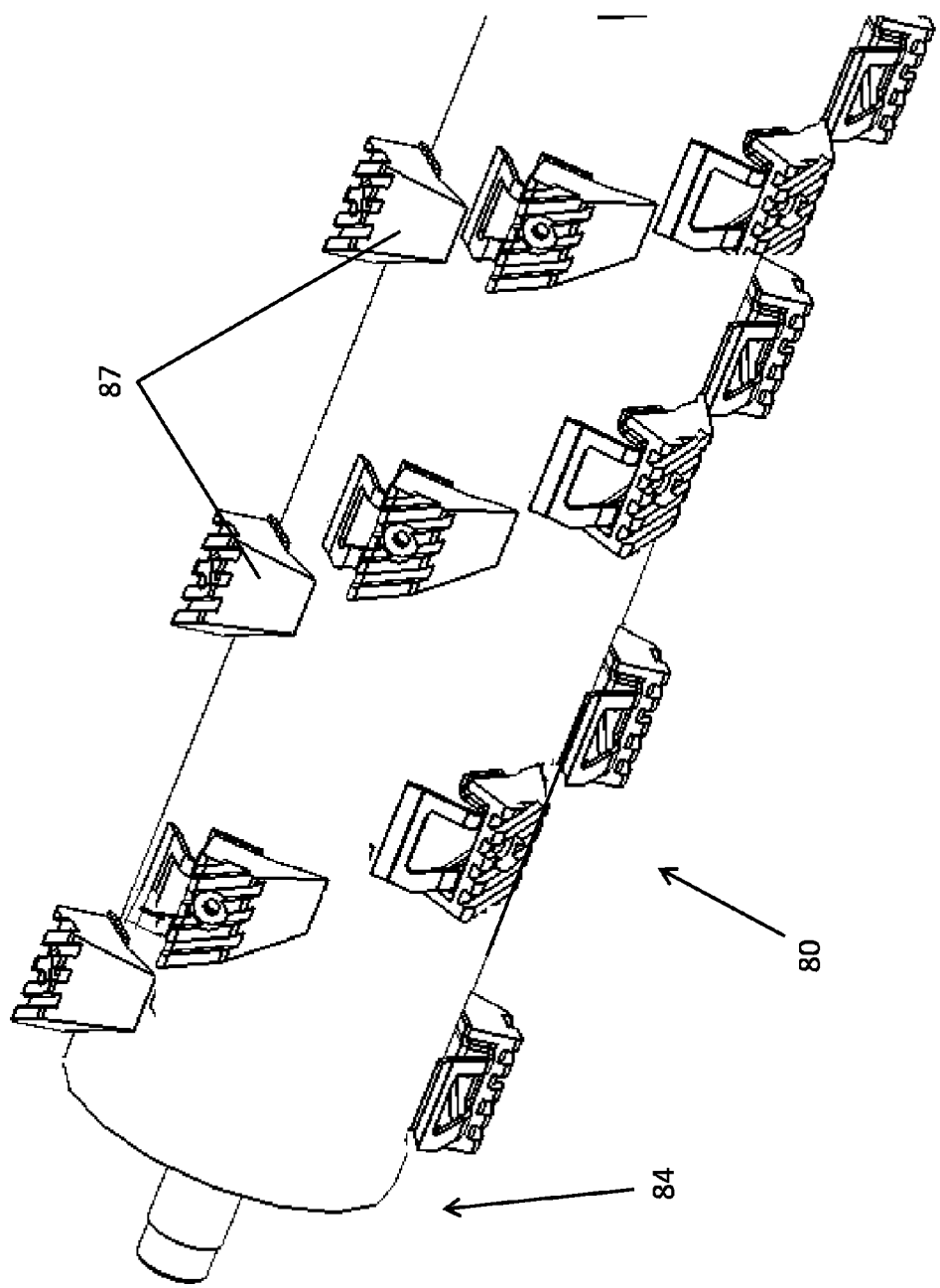
Figure 12:
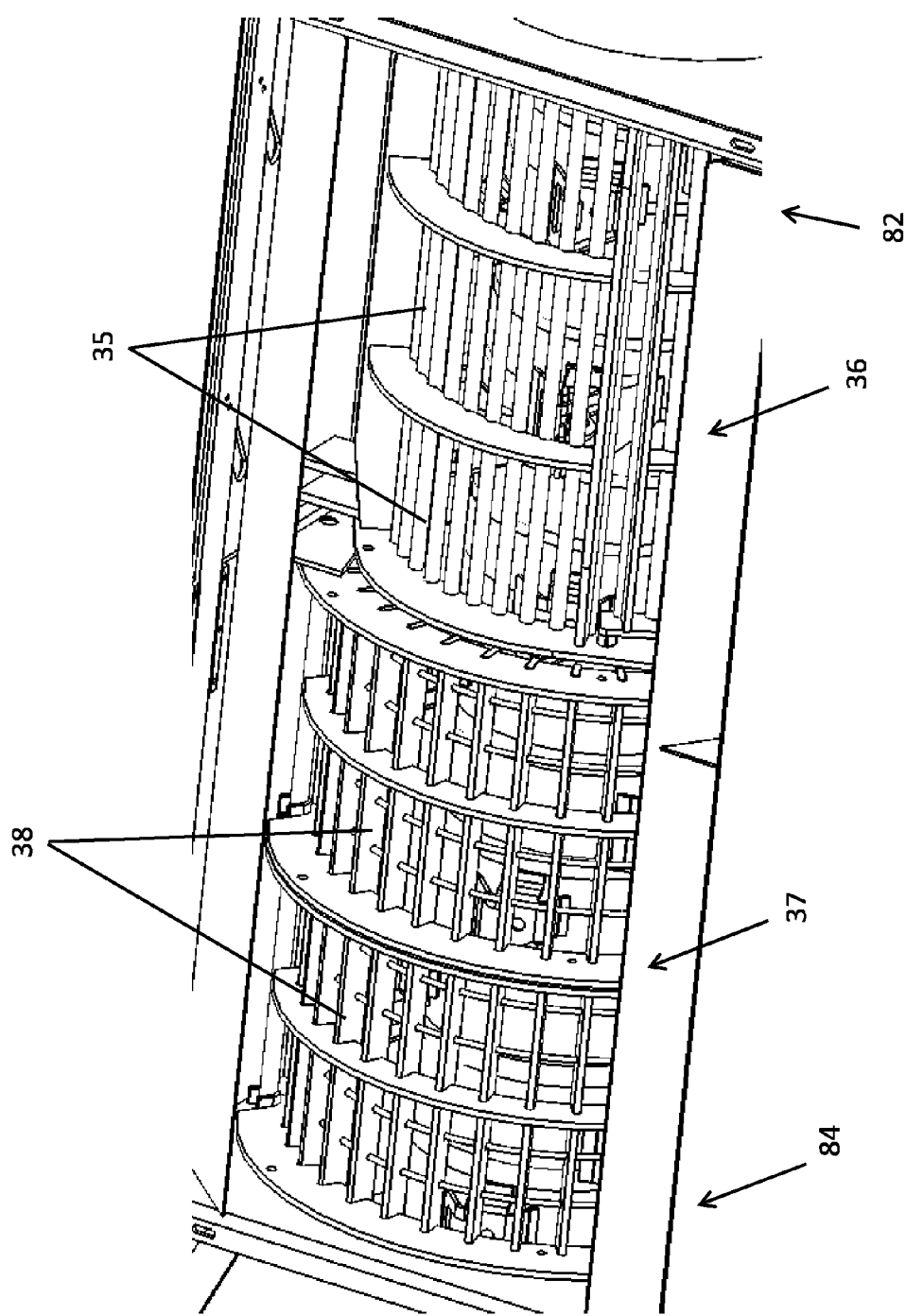

Having thus described the invention in general terms, reference will now be made to the accompanying drawings, which are not necessarily drawn to scale, and wherein:

FIG. 1 shows a perspective view of various portions of a combine harvester in accordance with an exemplary embodiment of the present invention;

FIG. 2 shows a side view of the portions of the combine harvester of FIG. 1 in accordance with an exemplary embodiment of the present invention;

FIG. 3 shows a side view of a rotor configured in accordance with an exemplary embodiment of the present invention;

FIG. 4 shows a perspective view of two rotors within a rotor module in accordance with an exemplary embodiment of the present invention;

FIG. 5 shows a perspective cross-sectional view of the rotor of FIG. 3;

FIG. 6 shows a perspective view of the rotor of FIG. 3 in an exploded configuration in accordance with an exemplary embodiment of the present invention;

FIG. 7 shows a perspective view of an auger drive coupling of a rotor in accordance with an exemplary embodiment of the present invention;

FIG. 8 shows a perspective view of a thresher drive coupling of a rotor in accordance with an exemplary embodiment of the present invention;

FIG. 9 shows a perspective view of an auger portion of a rotor from an auger inlet end in accordance with an exemplary embodiment of the present invention;

FIG. 10 shows a perspective view of an auger portion of a rotor from an auger outlet end in accordance with an exemplary embodiment of the present invention;

FIG. 11 shows a perspective view of a thresher outlet end with rasp bars in accordance with an exemplary embodiment of the present invention; and FIG. 12 shows a perspective view of rotor concaves in accordance with an exemplary embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. Some components of the combine harvester are not shown in one or more of the figures for clarity and to facilitate explanation of embodiments of the present invention.

As used herein, the terms "material," "crop," "plants," "crop material," and similar terms may be used interchangeably to refer generally to the plants being harvested and processed through the combine harvester, including grain and MOG. Thus, use of any such terms should not be taken to limit the spirit and scope of embodiments of the present invention. The crop material may include various types of grains such as, for example, corn, soybeans, canola, wheat, oat, rye, alfalfa, barley, rice, and sunflowers, among other crops, and/or the MOG associated therewith.

With reference to FIGS. 1 and 2, in general, a typical combine 10 includes a crop harvesting area 15, a feederhouse area 17, a threshing area 20, a cleaning area 22, and a grain delivery area 25. The crop harvesting area 15 may include a header 16 for gathering the grain from the planted crop. Although some headers 16 may be used for multiple different crops, a typical header is designed for use with a specific type of crop. As such, the header 16 may be removable from the combine so that other headers configured for use with other crops or crop row spacings may be attached in its place. In FIG. 1, for example, the depicted header 16 is configured for gathering corn.

Accordingly, as the combine moves through the field, the crop is gathered at the harvesting area 15, the crop material may then proceed to the feederhouse area 17, which may convey the crop material from the harvesting area 15 to the threshing area 20. In other words, the crop material cut by the header 16 at the harvesting area 15 (which at this point includes both grain and MOG) may be fed rearwardly toward the threshing area 20 via the feederhouse area 17.

Although the threshing area 20 may have different components and configurations, a typical axial-flow threshing apparatus includes a threshing rotor 30 (shown in FIG. 2) that is mounted within the combine 10. At least part of the threshing rotor 30 may be substantially surrounded by rotor concaves 35 that have an arrangement of relatively small openings. Thus, as the crop material travels rearwardly through the threshing area 20, the threshing rotor 30 threshes the crop material against the inside surface of the rotor concaves 35 and separator grates 38 (shown in FIG. 12), separating the grain from the MOG, as described in greater detail below.

The MOG typically continues to move through the rotor concaves 35 due to the rotation of the rotor 30 and is ultimately released out of the tail end of the rotor and is disposed onto the crop field, in some cases aided by a supplemental spreading device (not shown). The smaller crop material, composed substantially of grain, falls through the openings of the rotor concaves 35 and separator grates 38 and onto a conveyor 40 of a grain conveying area, which may be a belt, an auger, a shaker pan, vibratory pan, or any other mechanism for moving material between locations. The conveyor 40 thus forms the transition between the threshing area 20 and the cleaning area 22 and moves the grain from the threshing area 20 to the cleaning area 22, where the grain is placed onto a series of sieves 45 that move back and forth. The sieves 45 may include an arrangement of smaller openings that further separate the heavier grain from any other non-grain crop material.

In some embodiments, a fan 41 may be included that is configured to blow air across the grain so as to separate lighter non-grain crop material from the grain before the grain is collected in a grain pan 53. In some embodiments, the lighter non-grain material may be mixed with the larger non-grain crop material and may be disposed onto the crop field. Once the grain falls through the moving sieves 45, it reaches a grain handling system 50 positioned below the moving sieves 45.

In a typical harvesting application, the combine is configured to send all of the harvested grain directly to a grain tank 60. In some instances, however, at least a portion of the harvested grain is tested and/or sampled for various characteristics at a testing area. The testing area may include one or more testing stations configured to gather grain test data. The testing area may include, for example, a moisture test station, a bulk density station, and a plot weight station.

Alternatively or additionally, after the grain has been cleaned, it may be conveyed from the grain pan 53 to a grain tank 60 as part of the delivery area 25 via a transport system 65, such as a clean grain elevator, auger, conveyor, enclosed tubular drag cable and disc conveyor (such as a Cablevey® conveyor system), or vacuum transport system.

In typical combines, the threshing rotor 30 of the threshing area 20 is rotated as a unitary structure. Material to be threshed, such as ears of corn, may be received at one end of the rotor 30 at an auger portion and moved toward a threshing portion of the rotor 30, where the material is threshed against the inside surface of the rotor concaves 35 (e.g., separating the kernels of corn from MOG), as described above. The threshed material may then be moved through to the other end of the rotor 30. Due to the speed of rotation of the threshing rotor 30 and the structure of the rotor (e.g., the presence of blades or "flights" extending from the auger portion), material being received into the rotor may have a tendency to be ejected from or "bounce" out of the rotor, delaying entry of the material into the threshing portion. When a large volume of material to be threshed is received into the threshing area substantially simultaneously, however, the combined mass of the material and the continuous flow counteracts the natural ejection force of the rotating rotor, allowing for a more efficient threshing process. In addition, typical rotors in which the auger portion is rotated at the same (high) speed as the threshing portion may cause grain to be separated from MOG prematurely, e.g., at the auger portion rather than at the threshing portion, which is typically undesirable. By stopping or at least slowing down the rotation of the auger, more of the threshing process may occur in the designated threshing area.

Often, the ground speed of the combine may control the volume of material moving through each area of the combine, including the threshing area 20. Thus, in the case of a commercial combine designed to be continuously operated in a fully loaded condition, the performance (e.g., material throughput, harvesting efficiency, and harvested grain quality) of the threshing area is generally optimized due to the large volume of crop material being processed. In other cases, however, such as when small research plots of crop material are harvested (e.g., for testing of the grain), the same efficiencies may not be possible to achieve with a conventional combine.

As will be described below, the present invention is generally directed to a combine harvester 10 and method for threshing grain in which the auger portion and the threshing portion of the rotor are separably driven. In some embodiments, for example, grain is threshed in a staged manner to, in a sense, simulate the efficiencies of large plot harvesting and threshing. In general, the combine harvester 10 is moved through crop material comprising grain material and MOG. The grain material is separated from the MOG using multiple processing areas as the harvest material is transported through the combine harvester, including, for example, a threshing area 20, depicted in FIG. 1 and generally described above.

Upon entering the threshing area 20, however, the material may be collected at an auger portion of the threshing rotor and held until a collection threshold is reached. Once it is determined that the collection threshold is reached, the material (which now forms a first group of material) may be advanced to a threshing portion of the threshing rotor. In some cases, a gating mechanism may be provided that is configured to hold the material for accumulation prior to entry into the threshing area. In other cases, however, the auger portion may be configured to rotate at a speed that is independent of the speed of rotation of the threshing portion (e.g., stopped or moving at a slower speed) to allow for the material to be threshed to accumulate for achieving the collection threshold. In such cases, a batch of material may be allowed to accumulate immediately adjacent to the threshing area (e.g., at the auger portion), thereby reducing transport time into the threshing portion. Accordingly, the first group of material may be moved from the auger portion to the threshing portion of the threshing rotor substantially simultaneously, thus simulating the gathering of a large amount of crop material even when small plots are involved. In this way, the benefits of large-plot harvesting may be extended to small-plot applications, as described in greater detail below.

Referring now to FIGS. 3 and 4, the threshing area 20 may be configured such that material to be threshed is accumulated prior to the actual threshing process to enable threshing of a larger group of material at substantially the same time, for example, once a collection threshold has been reached. For example, as depicted in FIG. 3, the threshing rotor 30 may include an auger portion 70 and a threshing portion 80. The auger portion 70 may define an auger inlet end 72 and an auger outlet end 74, and rotation of the auger portion may serve to move the material to be threshed toward the auger outlet end.

In some embodiments, for example, the threshing rotor 30 may be disposed within a housing 90, as shown in FIG. 4. In some embodiments, two threshing rotors 30 may be provided in a side-by-side arrangement for independently threshing the material. The rotor may vary in diameter, depending on the size of the combine and the particular application, such as between approximately 18 inches and approximately 30 inches in diameter. An inlet extension 94 may be provided that directs material to be threshed toward the auger portion 70 of each threshing rotor 30, e.g., funneling material toward the auger portion. By positioning the inlet extension 94 at an upper location with respect to the auger portion 70, the force of gravity may be used to facilitate the movement of the material from the inlet into the threshing area 20 (e.g., toward the auger portion 70). In addition, such positioning of the inlet extension 94 may, in some cases, avoid the backward movement of material that may result from the rotation of the auger portion 70 when the inlet is disposed at a lower location.

The auger portion 70 may include flights 76, as depicted in FIGS. 3, 5, and 6. The flights 76 may have different configurations (e.g., size, shape, quantity) depending on the design of the combine and, for example, the type of material to be threshed (e.g., corn versus wheat). In FIG. 9, the auger portion 70 of the rotor 30 is shown from the auger inlet end 72, and in FIG. 10, the auger portion is shown from the auger outlet end 74. As noted above, the auger portion 70 may be configured to rotate about an axle 100 (FIGS. 5 and 6). Accordingly, with reference to FIG. 10, the auger portion 70 may define a void 105 at least partially therethrough that is configured (e.g., sized and shaped) to receive an end 101 of the axle 100. Bearings 106 and other components may also be provided that are configured to support the auger portion 70 and allow the rotation of the auger portion about the axle 100. The rotation of the auger portion 70 about the axle 100 may serve to move the material to be threshed in the direction of the auger outlet end 74 via the action of the auger flights 76.

Turning again to FIGS. 3-6 and 11, the threshing rotor 30 may further include a threshing portion 80 that is substantially aligned with the auger portion 70. The threshing portion 80 may also be configured to rotate about the axle 100. The threshing portion 80 may define a threshing inlet end 82 and a threshing outlet end 84, with the threshing inlet end 82 being configured to receive the material to be threshed from the auger outlet end 74. As mentioned above, the threshing portion 80 may be configured such that rotation of the threshing portion may serve to thresh the material and move the threshed material toward the threshing outlet end 84.

In this regard, and turning to FIGS. 4 and 12, the threshing portion 80 may be at least partially surrounded by rotor concaves 35, as described above. For example, the threshing portion 80 may be disposed above rotor concaves 35, where the rotor concaves (which may be, e.g., metal grates, as depicted) form a thresher section 36 and a separator section 37. Rasp bars 87 on the surface of the rotor 30 (shown in FIG. 11), in conjunction with the thresher section 36 of the concaves 35, may be configured to cause the material being threshed (e.g., the ears of corn) to rub against each other and surrounding portions of the housing to remove the grain from the MOG. In the case of corn, for example, the combined action of the rasp bars 87 and the rotor concaves 35 in the thresher section 36 may cause the kernels of corn to be removed from the ears. As the material continues to move toward the outlet end 84 of the threshing portion 80 of the rotor 30 due to the rotation of the threshing portion, the threshed grain may be separated from the MOG via the separator section 37 of the rotor concaves 35, for example, due to the configuration of the concaves 35 in the separator section. In other words, the rasp bars 87, which may extend along the threshing portion 80 in both the thresher section 36 and the separator section 37, may function to thresh the material in the threshing section, whereas the rasp bars may serve to move the threshed material and MOG along the concaves 35 in the separator section 37 to separate and extract the threshed material via openings in the concaves. Thus, the concaves 35 may have a different configuration in each of the thresher section 36 and the separator section 37 to facilitate the different functions in the threshing portion 80 of the rotor 30, as shown.

According to embodiments of the invention, the auger portion 70 may be driven independently from a threshing portion 80 of the threshing rotor 30, such that the auger portion may be rotated relatively slowly (or, in some embodiments, stopped) when less material is being fed to the threshing area 20 from the previous area without impacting the speed (and efficiency) of the threshing portion. By virtue of the slower movement, for example, material from the previous area may accumulate at the auger portion 70 to form a first group of material. Once a collection threshold is reached, the speed of the auger portion 70 may be increased to move the first group of material, in a batch, toward the threshing portion 80 of the rotor 30.

Because the speed of the auger portion 70 is independent of the speed of the threshing portion 80, a first group of material may be threshed via the threshing portion (which may require, for example, continuous rotation at high speed), while a second group of material is collected at the relatively slow-rotating (or stopped) auger portion 70. In this way, the auger portion 70 may serve as a staging location for the material prior to advancing a group of material, in batch form, to be threshed. Said differently, rotation of the threshing portion 80 independently of rotation of the auger portion 70 about the axle enables the material to be transported from the auger portion into the threshing portion substantially simultaneously.

In this regard, and with reference to FIGS. 4, 7, and 9, the auger portion 70 may comprise an auger drive shaft end 110 that is configured to be connected to an auger drive mechanism 115. The auger drive shaft end 110 may, for example, extend from or be otherwise attached to the auger portion 70. The auger drive mechanism 115 may directly mate with the auger drive shaft end 110 or, in some cases, intermediate components such as couplings 112 (shown in FIG. 7) may be used to facilitate the engagement of the auger drive mechanism with the auger drive shaft end.

Similarly, with reference to FIGS. 4 and 8, the threshing portion 80 may comprise a threshing drive shaft end 120 that is configured to be connected to a threshing drive mechanism 125. The threshing drive shaft end 120 may, for example, extend from or be otherwise attached to the threshing portion 80. The threshing drive mechanism 125 may directly mate with the threshing drive shaft end 120 or, in some cases, intermediate components (such as couplings) may be used to facilitate the engagement of the threshing drive mechanism with the threshing drive shaft end.

As shown in the depicted embodiment, the auger drive shaft end 110 may be disposed proximate the auger inlet end 72. The threshing drive shaft end 120 may be disposed proximate the threshing outlet end 84. In other embodiments, however, the threshing drive shaft end 120 may be configured to be connected to the threshing drive mechanism 125, and the auger drive shaft end 110 may be configured to be selectively connected to the threshing drive mechanism 125. For example, in some embodiments (not shown), the auger drive shaft end may be disposed proximate the auger outlet end 74 and may be configured to be selectively connected to the threshing drive mechanism 125 via a clutch or gear set (e.g., planetary gears) that selectively connects the auger drive shaft end to the threshing portion 80, such that rotation of the threshing portion causes rotation of the auger portion 70 when the clutch or gear set is engaged. In other embodiments, however, the auger portion 70 and the threshing portion 80 may be driven via a motor disposed proximate the auger inlet end 72, and the threshing portion may be configured to be selectively connected to the auger portion via a clutch.

Due to the separable nature of the auger portion 70 and the threshing portion 80, the auger portion may be configured to rotate at a first speed that is less than a speed of rotation of the threshing portion prior to a collection threshold of the material to be threshed being reached at the auger portion. For example, the auger portion 70 may be configured to rotate at a speed of approximately 50-250 revolutions per minute (rpm). The threshing portion may be configured to rotate at a higher speed of approximately 350-450 rpm. In contrast, in typical combine rotors, the rotor portions (auger portion and threshing portion) are typically configured to rotate (as a unit) at between 650 and 750 rpm, which translates to two flights per revolution of the auger, or an auger flight edge sweeping across the entry point of the rotor approximately every 0.04 seconds.

Alternatively, the auger portion 70 may be configured to be idle (e.g., not rotating) prior to a collection threshold of the material to be threshed being reached at the auger portion. For example, with respect to corn, in one embodiment, approximately 70 ears of corn may be introduced into the auger portion 70 while the auger is stopped. Once the collection threshold of (in this example) 70 ears is reached, the auger portion may be rotated at a predefined speed, such as between approximately 50 and 250 rpm to move the batch into the threshing portion 80. The auger portion 70 may be rotated for approximately 6 seconds before the entire batch has been moved to the threshing portion 80.

In some cases, once the collection threshold of the material to be threshed has been reached at the auger portion 70, the auger portion may be configured to rotate at a second speed that is substantially the same as a speed of rotation of the threshing portion, such as when there is a clutch coupling between the auger and the rotor, so as to move the material to be threshed toward the threshing portion 80 substantially simultaneously (e.g., in a single batch or as a single group of material). In the example described above, for example, the speed of rotation of the auger portion 70 may be accelerated from approximately 175-225 rpm to substantially match the speed of the threshing portion 80 of approximately 350-450 rpm. In other cases, however, the auger portion 70 may be configured to operate at a second speed that is still less than the speed of rotation of the threshing portion 80 once the collection threshold has been reached, but is greater than the first speed. Moreover, in some embodiments, a determination that the collection threshold of the material to be threshed has been reached at the auger portion 70 may automatically trigger the rotation of the auger portion 70 at the speed that is substantially the same as the speed of rotation of the threshing portion 80.

In this regard, the determination of whether the collection threshold has been achieved may be made in several different ways. In some cases, the collection threshold may be determined by determining whether the combine has reached an end of a plot. For example, when the end of a plot has been reached (e.g., when an entire row of plants in the plot or all of the plants in the plot have been cut and delivered to the auger), the collected group of material may be moved from the auger portion 70 to the threshing portion 80 of the rotor 30, as no additional material would be expected to be introduced to the group.

In other embodiments, the collection threshold may be determined temporally. For example, determining whether a collection threshold is reached may include determining whether a time period beginning at the start of collecting the harvest material is greater than or equal to a threshold time period. In some cases, the collection threshold may be determined based on the mass, volume, or quantity of material collected. For example, the determination may be based on whether a mass of the first group of material is greater than or equal to a threshold mass. Similarly, the determination may be based on whether a volume of the first group of material is greater than or equal to a threshold volume. In other cases, the operator of the combine may determine that the collection threshold has been reached (such as through a visual inspection). In still other cases, the determination may be made using a location-based trigger. For example, the location-based trigger may comprise determining whether a predetermined distance has been travelled by the combine or whether a predetermined time has elapsed. Alternatively, the location-based trigger may be based on a position of the combine in an area to be harvested, e.g., via a global positioning system (GPS) location or sensor input, such as a vision sensor. Any combination of methods may be used to determine whether a collection threshold is reached.

Alternatively, the auger portion 70 may be configured to operate constantly (e.g., not in batch mode) at a fixed speed that is different than the speed of the threshing portion 80. For example, during a continuous harvesting operation, the auger portion may be rotated at a speed of approximately 50-250 rpm and the threshing portion may be operated at a speed of approximately 350-450 rpm. Thus, there may be a permanent, predefined speed relationship between the auger portion 70 and the threshing portion 80, such that the relative reduced auger portion speed is gentler on the product being processed and may facilitate a more efficient transfer of material into the auger portion.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A rotor for threshing grain in a combine harvester, the rotor comprising: an auger portion configured to rotate about an axle, wherein the auger portion defines an auger inlet end and an auger outlet end, and wherein rotation of the auger portion serves to move harvested material to be threshed toward the auger outlet end; and a threshing portion substantially aligned with the auger portion, the threshing portion comprising rasp bars and configured to rotate, wherein the threshing portion defines a threshing inlet end and a threshing outlet end, wherein the threshing inlet end is configured to receive the harvested material to be threshed from the auger outlet end, wherein rotation of the threshing portion is independent of rotation of the auger portion, and wherein the auger portion is stopped or slowed via an auger drive mechanism that is independent from a thresher drive mechanism to allow the auger portion to serve as a staging location for the harvested material prior to the advancement of the harvested material into the threshing portion, and wherein the auger portion is positioned underneath a conveyer that deposits the material to be threshed onto the stopped or slowed auger portion.

2. The rotor of claim 1, wherein the auger portion comprises an auger drive shaft end configured to be connected to the auger drive mechanism, and wherein the threshing portion comprises a threshing drive shaft end configured to be connected to the threshing drive mechanism.

3. The rotor of claim 2, wherein the auger drive shaft end is disposed proximate the auger inlet end.

4. The rotor of claim 2, wherein the threshing drive shaft end is disposed proximate the threshing outlet.

5. A method for threshing grain in a combine harvester, the method comprising:
   rotating an auger portion about an axle, wherein the auger portion defines an auger inlet and an auger outlet, and wherein rotation of the auger portion serves to move material to be threshed from the auger inlet toward the auger outlet; and
   rotating a threshing portion comprising rasp bars, wherein the threshing portion defines a threshing inlet and a threshing outlet, wherein the threshing inlet is configured to receive harvested material to be threshed from the auger outlet,
   wherein rotation of the threshing portion is independent of rotation of the auger portion, and
   wherein the auger portion is stopped or slowed via an auger drive mechanism that is independent from a thresher drive mechanism to allow the auger portion to serve as a staging location for the harvested material prior to the advancement of the harvested material into the threshing portion, and
   wherein the auger portion is positioned underneath a conveyer that deposits the material to be threshed onto the stopped or slowed auger portion.

6. The method of claim 5, wherein the auger portion comprises an auger drive shaft end configured to be connected to the auger drive mechanism, and wherein the threshing portion comprises a threshing drive shaft end configured to be connected to the threshing drive mechanism.

7. The method of claim 6, wherein the auger drive shaft end is disposed proximate the auger inlet.

8. The method of claim 6, wherein the threshing drive shaft end is disposed proximate the threshing outlet.

* * * * *